Patented Oct. 8, 1940

2,217,019

UNITED STATES PATENT OFFICE 2,217,019

TREATMENT OF HYDROCARBONS

Vladimir N. Ipatieff and Aristid V. Grosse, Chicago, Ill., assignors to Universal Oil Products Company, Chicago, Ill., a corporation of Delaware No Drawing. Application February 28, 1938, Serial No. 193,065

10 Claims. (Cl. 196—10)

This invention relates to the treatment of iso-butane with the normally gaseous olefinic hydrocarbons to produce alkylated derivatives boiling within the range of gasoline and having specially good antiknock value.

Commercial cracking processes which are operated principally with the object of producing gasoline from heavier and less valuable petroleum fractions incidentally produce considerable yields of fixed gases comprising besides hydrogen; methane, ethane, propane and butanes as well as ethylene, propylene, and butylenes in varying quantities and proportions. In most instances these gases are considered to have merely a fuel value though attempts are made from time to time to utilize the olefinic constituents for the manufacture of derivatives on a commercial basis. The iso-butane and olefins necessary for the process may be produced from special cracked gas mixtures by methods involving fractionation and selective solvent extraction of close fractions to separate olefins. Since normal butanes are substantially unreactive with the gaseous olefins, and since there is no special disadvantage in having the corresponding paraffin hydrocarbons mixed with the olefins, reactions may be brought about between mixtures of iso-butane and normal butane on the one hand and ethylene, ethane, propylene, and propane, and also the butylenes including normal and iso-butylene on the other hand. The necessary reactants, however, may be produced from any desired source and the process is not limited to the interaction of hydrocarbon mixtures produced from the by-product gases of oil cracking.

In one specific embodiment the present invention comprises the production of alkylated derivatives of iso-butane by treatment thereof with normally gaseous olefins comprising ethylene, propylene and butylenes at temperatures within the approximate range of 0 to +35° C. in the presence of composite catalysts comprising boron fluoride, hydrogen fluoride, and/or water and nickel.

One essential feature of the present invention is the utilization of properly chosen temperatures of treatment so that the vigorous action of the catalyst composites is utilized for accelerating alkylation reactions between the two classes of hydrocarbons and these reactions occur rather than simple polymerization of the olefins involved. In other words, within the temperature range indicated, the rate of the polymerization reactions is reduced while apparently the rate of the alkylation reactions is not reduced to the same extent so that alkylation takes place in preference to polymerization. The polymerization of the normally gaseous olefins is attended by thermal processes somewhat difficult to control particularly in the case of ethylene and the polymerization products are still olefinic and require hydrogenation in some instances to render them acceptable as high grade fuel such as those employed in airplane engines. The present process produces saturated hydrocarbons of an isomeric character and in so doing utilizes a considerable proportion of the four carbon atom paraffin hydrocarbons present in cracked gases so that it is efficient from both standpoints.

The selectivity of the reactions in regard to the formation of desired alkylation products rather than undesired olefin polymerization products is preferably further increased by employing a moderate excess of the paraffin in the reaction zone. As a rule best results are obtained in regard to the yield of alkylated products when about 2 moles of iso-butane to 1 mole of olefin are present at all times. This as a rule furnishes sufficient excess to substantially minimize the polymerization of the olefins and assure the production of good yields of products of primary or at most of secondary alkylation reactions without formation of products resulting from more extensive alkylation or decompositions of the primary products. Conditions of operation are varied to compensate as far as possible for the proportioning of the iso-butane and the olefins.

The preferred type of catalyst is of a composite character and comprises essentially boron fluoride and finely divided active nickel along with minor but definitely essential quantities of either hydrogen fluoride or water. It is probable that the hydrogen fluoride is the material which adds the required efficacy to the boron fluoride-nickel combination since the reaction will occur in the absence of moisture if a small amount of hydrogen fluoride is present. However, the catalytic effect is also engendered by the presence of moisture without the addition of hydrogen fluoride in which case it is probable that the fluoride is partially hydrolyzed to generate some free hydrogen fluoride. It is possible also that some particular compound resulting from the interaction of the catalyst ingredients acts as the real catalyst though obviously it is difficult to isolate any such compound particularly since there are known to be several hydroborofluoric acids with corresponding nickel salts, any of which may contribute largely to the catalytic effects when the present type of composites are used. Boron fluoride (BF₃) is a colorless gas with a specific gravity of 2.3 referred to air and a considerable solubility in cold water and can be prepared by heating a mixture of boron trioxide $B_2O_3$ and calcium fluoride with sulfuric acid or a mixture of potassium borofluoride and boron sesquioxide with sulfuric acid.

The process may be conducted in any suitable type of apparatus or in batch or continuous manner by suitable modification of the conditions of operation. In a batch operation finely divided nickel may be placed in a nickel lined pressure vessel after which a mixture of boron fluoride and hydrogen fluoride are introduced under pressure. The usual procedure is next to add a small amount of liquid iso-butane and then to introduce gradually a proportioned mixture of iso-butane containing dissolved olefins, observing the precaution already noted of having an excess of the paraffin present. The olefins may also be added in a separate stream in the proper proportion to react with the iso-butane.

The contents of the pressure vessel are agitated by rotation or by mechanical stirring and the hydrocarbon mixture is introduced at a rate consistent with the maintenance of a proper temperature and until the vessel contains a sufficient amount of liquefied products to warrant their removal. Owing to the excess of iso-butane present a certain amount will dissolve in the products of alkylation and a minor amount may be evolved which can be vented to prevent the development of excess pressure. Any loss of boron fluoride or hydrogen fluoride from this source may be compensated for by further additions as is found necessary. Following the completion of the batch run, the desired alkylated products may be freed from dissolved iso-butane by subsequent stabilization and this iso-butane may be re-used in succeeding operations.

Continuous operations may also be conducted wherein streams of boron fluoride, hydrogen fluoride, iso-butane, and olefins are separately introduced to pass through beds of contact material containing nickel, the subsequent fractionation of the products permitting separation of the alkylated derivatives and the production of iso-butane, boron fluoride, and hydrogen fluoride which can be recycled. The details of such an operation, involving the pre-cooling of the streams of boron fluoride, hydrogen fluoride and hydrocarbons and the maintenance of the proper temperature in the tube or chamber containing nickel can be readily realized by those conversant with commercial operations of this character. The rate of flow over the nickel contact will be adjusted to produce the desired degree of alkylation.

Under the preferred conditions of temperature, the principal reaction occurring when an excess of iso-butane over olefins is maintained corresponds to the interaction of one molecule of each to produce relatively large yields of mono-alkylated derivatives. However, some dialkylated products will also be produced corresponding to the union of iso-butane with two molecules of olefins and there are other unavoidable side reactions which produce other products.

The following examples are introduced to indicate the character of the results obtainable in the normal operation of the process although not with the intention of limiting its scope in exact correspondence therewith.

*Example I.*—10 parts by weight of nickel powder and 150 parts by weight of fine nickel shot were placed in a nickel lined pressure vessel, the vessel was cooled to a temperature of 0° C. and 347 parts by weight of iso-butane were added. The pressure vessel was then closed and 9 parts by weight of hydrogen fluoride and 30 parts by weight of boron fluoride pumped in. The vessel was then rotated and 176 parts by weight of ethylene was gradually added during a period of 5 hours. Substantially all of the ethylene reacted and there was an excess of 112 parts by weight of unreacted iso-butane. The products were all saturated and the following table shows the yields of hydrocarbons in the recovered liquid mixture exclusive of the iso-butane.

| Compound: | Weight per cent |
|---|---|
| Pentanes | 8.1 |
| Hexanes | 44.3 |
| Heptanes | 10.9 |
| Octanes | 16.5 |
| Nonanes | 7.1 |
| Decanes | 4.3 |
| Undecanes and dodecanes | 5.6 |
| Heavier than decanes | 3.2 |

There was considerable production of gas which consisted of approximately 15% hydrogen and 85% propane.

*Example II.*—To a nickel lined pressure vessel 10 parts by weight of powdered nickel and 150 parts by weight of small nickel shot were added. The vessel was cooled to a temperature of approximately +5° C. and 70 parts by weight of liquid iso-butane added after which the vessel was closed. 5.1 parts by weight of hydrogen fluoride and 12.3 parts by weight of boron fluoride were then forced into the pressure vessel and a liquefied mixture of propylene and iso-butane was gradually added during vigorous mechanical agitation of the contents of the vessel. The proportioning of the iso-butane and propylene in the liquid mixture added was in the ratio of approximately 27 parts by weight of the former to 16 parts by weight of the latter and a total of 430 parts by weight were added over a period of 2 hours. After the completion of the reactions the contents of the pressure vessel were examined and it was found that substantially all of the propylene had undergone reaction while 120 parts by weight of iso-butane was still present. The products were all saturated hydrocarbons and the following table indicates the percentage by weight of the different hydrocarbons found by fractional analysis.

| Compound: | Weight per cent |
|---|---|
| Pentanes and hexanes | 5 |
| Heptanes | 34 |
| Octanes | 18 |
| Nonanes | 9 |
| Decanes | 14 |
| Undecanes and dodecanes | 15 |
| Heavier than decanes | 5 |

The heptane fraction showed an octane number of 86 by the motor method in comparison with the standard iso-octane and similarly the octane fraction showed an octane number of 84. These figures indicate a relatively high percentage of isomeric compounds in these fractions. Substantially all of the above material boiled within the range of ordinary gasoline and was directly utilizable as a high antiknock motor fuel.

*Example III.*—5 parts by weight of powdered nickel was introduced into a nickel lined pressure vessel, the vessel was closed and 25 parts by weight of hydrogen fluoride and 35 parts by weight of boron fluoride were introduced under pressure at ordinary temperatures, after which 100 parts by weight of iso-butane were added and the vessel cooled to a temperature of 0° C. The vessel was provided with a mechanical stirring device and during vigorous agitation of the bomb contents a mixture of 600 parts by weight of iso-butene was gradually added during a period of about 5 hours.

Analysis of the product after removal of the excess of iso-butane indicated that approximately 1.2 moles of iso-butane had reacted with 1.0 moles of iso-butene to form a mixture of hydrocarbons of a completely saturated character. The product was water white and 98% boiled below 400° F. 85% of the gasoline boiling range material boiled within the range of 230 to 240° F. indicating that it was a mixture of octanes. The octane number of this fraction as determined by the motor method was 94.

This application is a continuation-in-part of our copending application, Serial No. 20,098, filed May 6, 1935, which is in turn a continuation-in-part of our earlier application, Serial No. 736,576, filed July 23, 1934.

We claim as our invention:

1. A process for the manufacture of derivatives of iso-butane which comprises subjecting said iso-butane to contact with normally gaseous olefins selected from the group consisting of ethylene, propylene, and butylene, in the presence of boron fluoride, nickel, hydrogen fluoride and water.

2. A process for the manufacture of derivatives of iso-butane which comprises subjecting said iso-butane to contact with normally gaseous olefins selected from the group consisting of ethylene, propylene, and butylene, in the presence of a catalyst comprising essentially a mixture of boron fluoride, hydrogen fluoride, and nickel.

3. A process for the manufacture of derivatives of iso-butane which comprises subjecting said iso-butane to contact with normally gaseous olefins selected from the group consisting of ethylene, propylene, and butylene in the presence of a catalyst comprising essentially a proportioned mixture of boron fluoride, water, and nickel.

4. A process for the manufacture of derivatives of iso-butane which comprises subjecting said iso-butane to contact with normally gaseous olefins selected from the group consisting of ethylene, propylene, and butylene at temperatures within the approximate range of 0 to $+35°$ C. in the presence of boron fluoride, nickel, hydrogen fluoride and water.

5. A process for the manufacture of derivatives of iso-butane which comprises subjecting said iso-butane to contact with normally gaseous olefins selected from the group consisting of ethylene, propylene, and butylene at temperatures within the approximate range of 0 to $+35°$ C. in the presence of a catalyst comprising essentially a proportioned mixture of boron fluoride, hydrogen fluoride, and nickel.

6. A process for the manufacture of derivatives of iso-butane which comprises subjecting said iso-butane to contact with normally gaseous olefins selected from the group consisting of ethylene, propylene and butylene at temperatures within the approximate range of 0 to $+35°$ C. in the presence of a catalyst comprising essentially a proportioned mixture of boron fluoride, water, and nickel.

7. A process for producing hydrocarbons boiling in the gasoline range which comprises reacting iso-butane with a normally gaseous olefin in the presence of boron fluoride, nickel and hydrogen fluoride.

8. A process for producing hydrocarbons boiling in the gasoline range which comprises reacting iso-butane with a normally gaseous olefin in the presence of boron fluoride, nickel and water.

9. A process for producing hydrocarbons boiling in the gasoline range which comprises reacting iso-butane with a normally gaseous olefin in the presence of boron fluoride, nickel and hydrogen fluoride at a temperature of about 0° C. to 35° C.

10. A process for producing hydrocarbons boiling in the gasoline range which comprises reacting iso-butane with a normally gaseous olefin in the presence of boron fluoride, nickel and water at a temperature of about 0° C. to 35° C.

VLADIMIR N. IPATIEFF.
ARISTID V. GROSSE.